US008718883B2

(12) United States Patent
Tanaka et al.

(10) Patent No.: US 8,718,883 B2
(45) Date of Patent: May 6, 2014

(54) CONTINUOUSLY VARIABLE TRANSMISSION AND POWER ON/OFF DETERMINATION METHOD

(75) Inventors: Hiroyasu Tanaka, Atsugi (JP);
Masahide Ito, Atsugi (JP); Masato Mori, Isehara (JP); Takashi Eguchi, Machida (JP); Ryousuke Nonomura, Kawasaki (JP); Seiichiro Takahashi, Isehara (JP); Mamiko Inoue, Ebina (JP)

(73) Assignee: Jatco Ltd, Fuji-shi (JP)

( * ) Notice: Subject to any disclaimer, the term of this patent is extended or adjusted under 35 U.S.C. 154(b) by 292 days.

(21) Appl. No.: 13/216,993

(22) Filed: Aug. 24, 2011

(65) Prior Publication Data

US 2012/0059558 A1    Mar. 8, 2012

(30) Foreign Application Priority Data

Sep. 8, 2010   (JP) ................................ 2010-200831

(51) Int. Cl.
*B60K 6/46*    (2007.10)
(52) U.S. Cl.
USPC ............................................. 701/52; 192/20
(58) Field of Classification Search
USPC ............. 701/51, 52; 192/20, 52.1, 52.4, 54.1, 192/71, 82 R, 85.02, 85.11; 477/15, 18, 34, 477/39, 107, 110, 115
See application file for complete search history.

(56) References Cited

U.S. PATENT DOCUMENTS

| 5,231,898 | A | * | 8/1993 | Okura .............................. 477/95 |
| 6,039,674 | A | * | 3/2000 | Dourra et al. ................. 477/166 |
| 6,093,133 | A | * | 7/2000 | Danielsen et al. ............ 477/117 |
| 6,736,757 | B2 | | 5/2004 | Kubo et al. |
| 7,493,203 | B2 | | 2/2009 | Bitzer et al. |
| 2002/0142886 | A1 | | 10/2002 | Kubo et al. |
| 2005/0227809 | A1 | | 10/2005 | Bitzer et al. |
| 2010/0211276 | A1 | | 8/2010 | Tokura et al. |

FOREIGN PATENT DOCUMENTS

| EP | 1 865 227 A1 | 12/2007 |
| EP | 1 933 064 A2 | 6/2008 |
| JP | 61-167752 A | 7/1986 |
| JP | 05-079554 A | 3/1993 |
| JP | 06-323415 A | 11/1994 |
| JP | 2001-221338 A | 8/2001 |
| JP | 2002-243031 A | 8/2002 |
| JP | 2002-295663 A | 10/2002 |
| WO | WO 03/067127 A2 | 8/2003 |

* cited by examiner

Primary Examiner — Dalena Tran
(74) Attorney, Agent, or Firm — Foley & Lardner LLP

(57) ABSTRACT

In a manual mode, a gear position of a continuously variable transmission is selected based on an input operation from a driver, a final through speed ratio is set based on the selected gear position and a variator and a sub-transmission mechanism are controlled to realize the final through speed ratio. Whether an input torque to the sub-transmission mechanism is positive or negative is determined based on an input torque to the sub-transmission mechanism when the manual mode is selected.

9 Claims, 6 Drawing Sheets

CONTINUOUSLY VARIABLE TRANSMISSION AND POWER ON/OFF DETERMINATION METHOD

FIELD OF THE INVENTION

The present invention relates to a continuously variable transmission including a continuously variable transmission mechanism and a sub-transmission mechanism and particularly to a technology for determining whether an input torque to the sub-transmission mechanism is positive or negative (power ON/OFF determination).

BACKGROUND OF THE INVENTION

In a continuously variable transmission (hereinafter, referred to as a "CVT with a sub-transmission mechanism") including a combination of a continuously variable transmission mechanism (variator) and a sub-transmission mechanism, a shift range can be enlarged and fuel economy can be improved as compared with normal continuously variable transmissions.

In the case of shifting the sub-transmission mechanism in this CVT with the sub-transmission mechanism, it is possible to suppress a change of a through speed ratio, which is a speed ratio of the entire transmission, before and after the shift and suppress a shift shock by performing a synchronization shift for shifting a speed ratio of the variator in a direction opposite to a shifting direction of the sub-transmission mechanism (JP5-79554A).

A technology for providing a manual mode in a continuously variable transmission and controlling a speed ratio of the continuously variable transmission to a speed ratio corresponding to a gear position selected by a driver is known (JP2002-243031).

SUMMARY OF THE INVENTION

It is also possible to provide a manual mode in a CVT with a sub-transmission mechanism. In the CVT with the sub-transmission mechanism including the manual mode, the variator and the sub-transmission mechanism are so controlled that a through speed ratio becomes a speed ratio corresponding to a gear position selected by a selector operation or paddle operation of a driver. Although a gear position of the sub-transmission mechanism is changed depending on the selected gear position, a shift shock can be suppressed if the above synchronization shift is performed.

In the case of shifting the sub-transmission mechanism, it is necessary to determine whether an input torque to the sub-transmission mechanism is positive or negative (hereinafter, referred to as "power ON/OFF determination"). This is because shift phases occur in the order of a torque phase (phase in which a frictional engagement element responsible for torque transmission is switched) and an inertia phase (phase in which a speed ratio of the sub-transmission mechanism actually changes) in up-shifting performed when the input torque is positive and in down-shifting performed when the input torque is negative, whereas the order of the shift phases is reversed and a required hydraulic control is different in up-shifting performed when the input torque is negative and in down-shifting performed when the input torque is positive.

The power ON/OFF deter urination can be made based on an engine torque. However, in the manual mode, the sub-transmission mechanism may be shifted in a condition where an accelerator pedal opening is small and the engine torque is small in response to a selector operation or paddle operation by a driver. In this case, there is a possibility that a determination based on the engine torque is erroneously made. This is because, in the condition where the accelerator pedal opening is small and the engine torque is small, the input torque to the sub-transmission mechanism may become negative due to belt friction, an inertia change accompanying the shift of the variator and the like even if the engine torque is positive.

If the determination is erroneously made, the hydraulic control cannot be normally executed and problems occur such as disruption of the synchronization shift caused by a rotation speed change in the torque phase and occurrence of rotational stagnation caused by a slow change of the rotation speed despite the ongoing inertia phase.

The present invention was developed in view of such technical problems and aims to improve accuracy of a power ON/OFF determination in a manual mode.

According to an aspect of the present invention, a continuously variable transmission mounted in a vehicle to shift and transmit output rotation of a driving source, includes a variator which changes a speed ratio continuously; a stepped sub-transmission mechanism provided in series with the variator; a transmission control unit which selects either one of an auto mode in which a final through speed ratio as a target value of an overall speed ratio of the variator and the sub-transmission mechanism is set based on a driving condition of the vehicle and the variator and the sub-transmission mechanism are controlled to realize the final through speed ratio or a manual mode in which a gear position of the continuously variable transmission is selected based on an input operation from a driver, the final through speed ratio is set based on the selected gear position and the variator and the sub-transmission mechanism are controlled to realize the final through speed ratio; and a power ON/OFF determination unit which determines whether an input torque to the sub-transmission mechanism is positive or negative based on the input torque to the sub-transmission mechanism when the manual mode is selected.

According to another aspect of the present invention, a power ON/OFF determination method for determining whether an input torque to a stepped sub-transmission mechanism is positive or negative in a continuously variable transmission including a variator which changes a speed ratio continuously and the sub-transmission mechanism provided in series with the variator and mounted in a vehicle to shift and transmit output rotation of a driving source, includes selecting either one of an auto mode in which a final through speed ratio as a target value of an overall speed ratio of the variator and the sub-transmission mechanism is set based on a driving condition of the vehicle and the variator and the sub-transmission mechanism are controlled to realize the final through speed ratio or a manual mode in which a gear position of the continuously variable transmission is selected based on an input operation from a driver, the final through speed ratio is set based on the selected gear position and the variator and the sub-transmission mechanism are controlled to realize the final through speed ratio; and determining whether the input torque to the sub-transmission mechanism is positive or negative based on the input torque to the sub-transmission mechanism when the manual mode is selected.

Embodiments and advantages of this invention will be described in detail below with reference to the attached figures.

DESCRIPTION OF THE PREFERRED EMBODIMENTS

Hereinafter, an embodiment of the present invention is described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

Figure 1:
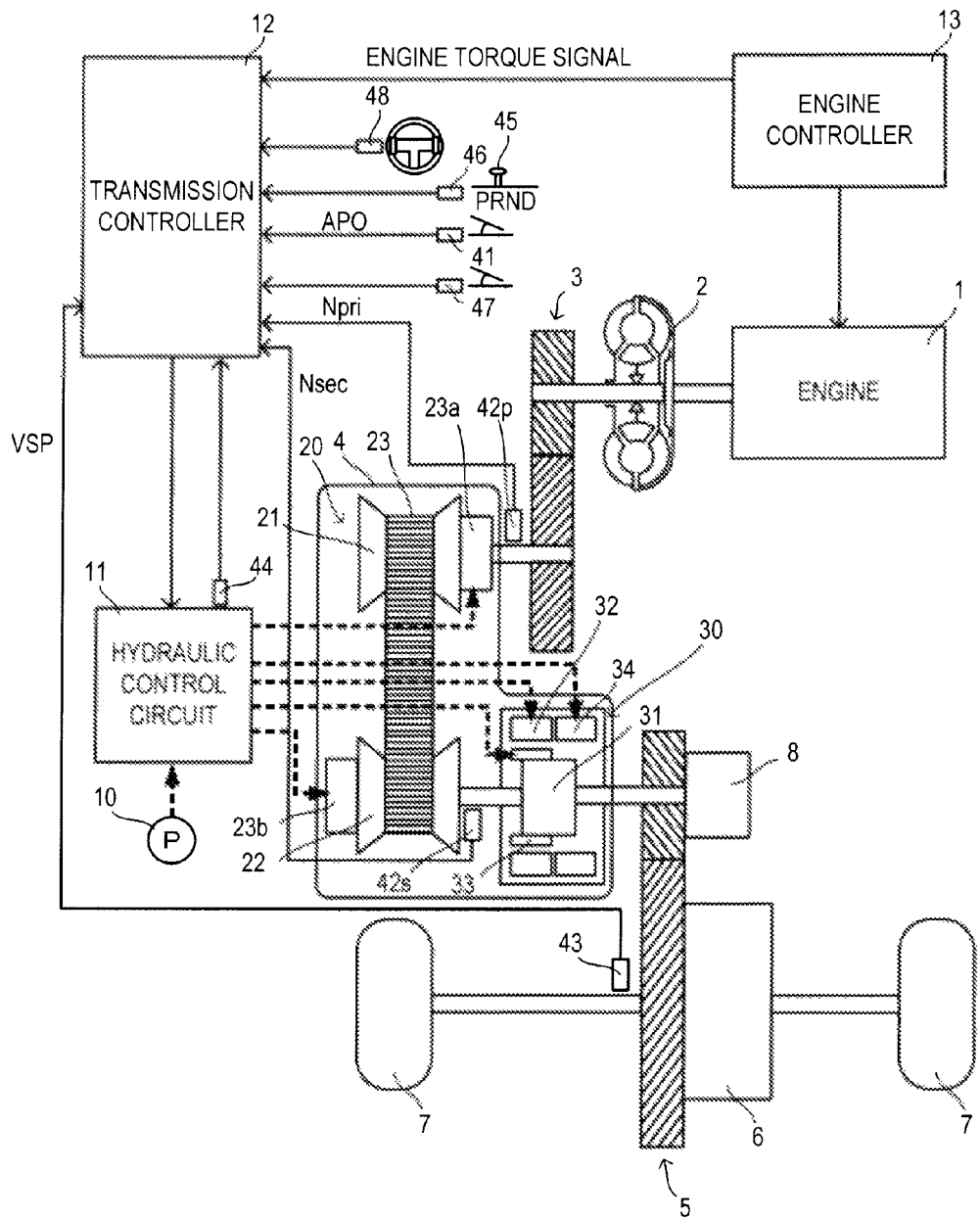
FIG. 1 is a schematic construction diagram of a vehicle including a continuously variable transmission according to an embodiment of the present invention.

FIG. 1 is a schematic construction diagram of a vehicle including a continuously variable transmission according to this embodiment. This vehicle includes an engine 1 as a driving source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle is provided with an engine controller 13 for controlling the engine 1, an oil pump 10 which is driven using a part of power of the engine 1, a hydraulic control circuit 11 for adjusting a hydraulic pressure from the oil pump 10 and supplying the adjusted hydraulic pressure to respective components of the transmission 4 and a transmission controller 12 for controlling the hydraulic control circuit 11.

The transmission 4 includes a continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in this power transmission path. The sub-transmission mechanism 30 may be directly connected to an output shaft of the variator 20 as in this example or may be connected via another transmission or power transmission mechanism (e.g. gear train).

The variator 20 is a V-belt continuously variable transmission mechanism including a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the width of the V-groove changes to change contact radii of the V-belt 23 and the respective pulleys 21, 22, whereby a speed ratio vRatio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed. For example, the sub-transmission mechanism 30 is set to a first gear position if the low brake 32 is engaged and the high clutch 33 and the reverse brake 34 are released. The transmission mechanism 30 is set to a second gear position with a speed ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high brake 33 are released. In the following description, a case where the sub-transmission mechanism 30 is in the first gear position is expressed by that "the transmission 4 is in a low-speed mode" and a case where the sub-transmission mechanism is in the second gear position is expressed by that "the transmission 4 is in a high-speed mode".

Figure 2:
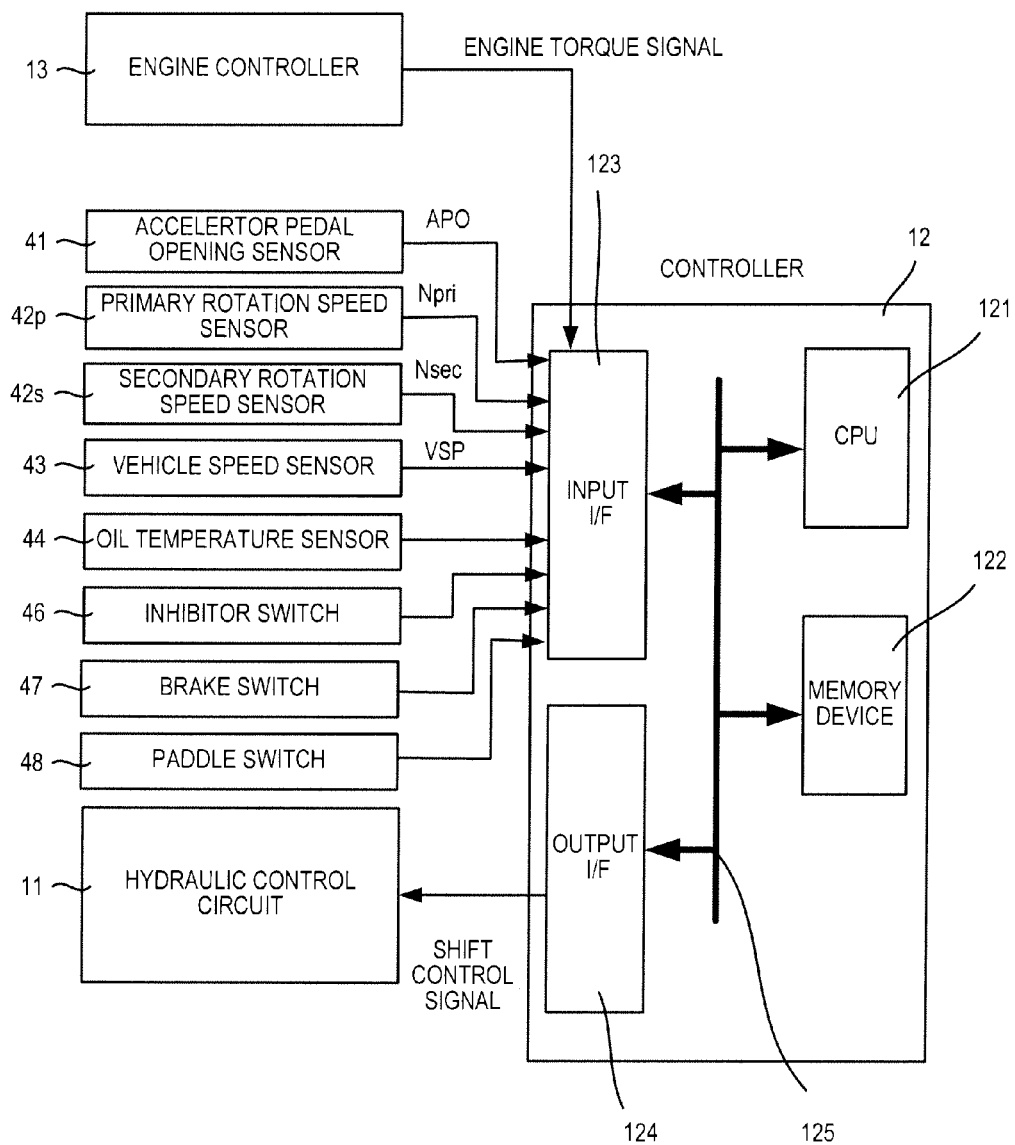
FIG. 2 is a diagram showing the internal construction of a transmission controller.

The transmission controller 12 includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting the opening of an accelerator pedal (hereinafter, referred to as an "accelerator pedal opening APO"), an output signal of a primary rotation speed sensor 42p for detecting an input rotation speed of the transmission 4 (=rotation speed of the primary pulley 21, hereinafter, referred to as a "primary rotation speed Npri"), an output signal of a secondary rotation speed sensor 42s for detecting an output rotation speed of the transmission 4 (=rotation speed of the secondary pulley 22, hereinafter, referred to as a "secondary rotation speed Nsec"), an output signal of a vehicle speed sensor 43 for detecting a driving speed of the vehicle (hereinafter, referred to as a "vehicle speed VSP"), an output signal of an oil temperature sensor 44 for detecting the oil temperature of the transmission 4, an output signal of an inhibitor switch 46 for detecting the position of a selector 45, an output signal of a brake switch 47 for detecting depression of a brake pedal, an output signal of a paddle switch 48 for selecting a gear position in a manual mode to be described later, an engine torque signal from the engine controller 13 and like output signals.

A transmission control program of the transmission 4 and shift maps (FIGS. 3, 4) used in this transmission control program are stored in the memory device 122. The CPU 121 reads the transmission control program stored in the memory device 122 and implements it, performs various computations on various signals input via the input interface 123 to generate a shift control signal, and outputs the generated shift control signal to the hydraulic control circuit 11 via the output interface 124. Various values used in the computations by the CPU 121 and computation results are appropriately stored in the memory device 122.

The hydraulic control circuit 11 includes a plurality of flow passages and a plurality of hydraulic control valves. In accordance with the shift control signal from the transmission controller 12, the hydraulic control circuit 11 controls the plurality of hydraulic control valves to switch supply paths of the hydraulic pressure, prepares a necessary hydraulic pressure from a hydraulic pressure produced in the oil pump 10, and supplies this hydraulic pressure to the respective components of the transmission 4. In this way, the speed ratio vRatio of the variator 20 and the gear position of the sub-transmission mechanism 30 are changed to shift the transmission 4.

An accumulator for preventing a shock caused by sudden engagement of the frictional engagement elements is provided before the low brake 32.

Figure 3:
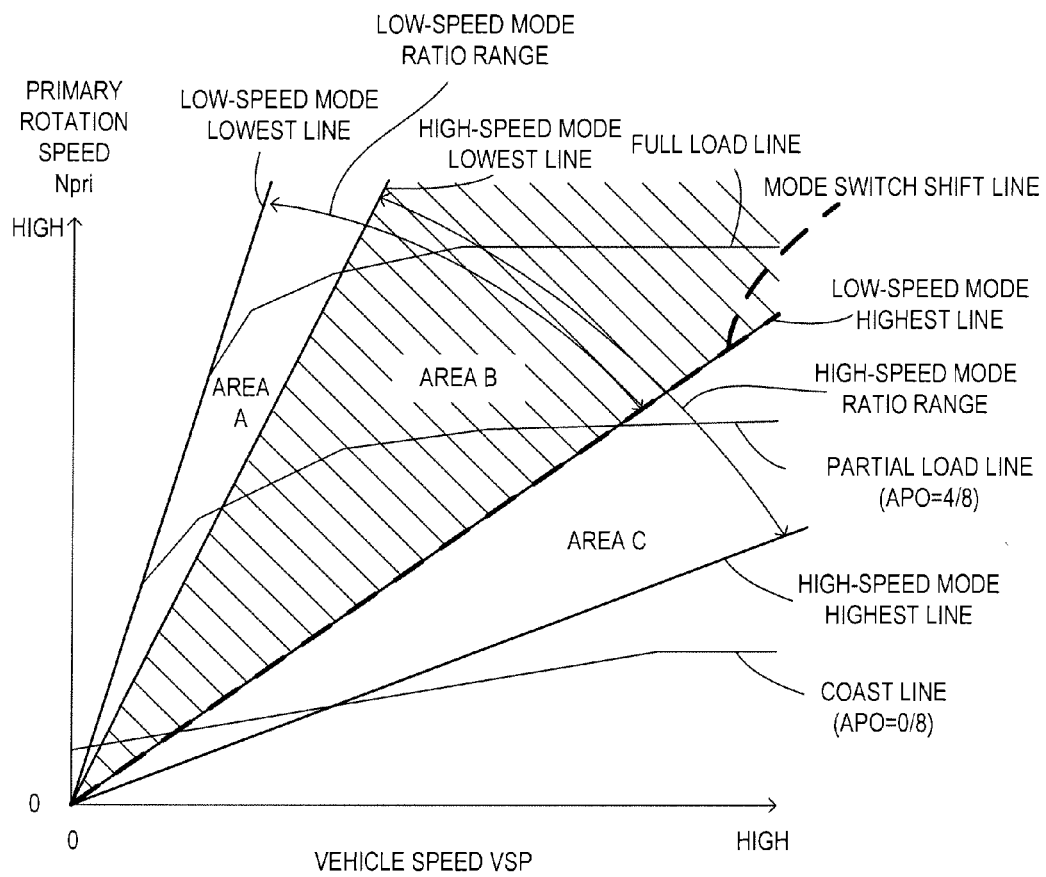
FIG. 3 is a graph showing an example of a shift map used in an auto mode.

FIG. 3 shows an example of the shift map stored in the memory device 122 of the transmission controller 12. This shift map is a map used in a mode in which the selector 45 is in a D position and the shift of the transmission 4, i.e. shifts of the variator 20 and the sub-transmission mechanism 30 are automatically made based on the accelerator pedal opening APO and the vehicle speed VSP (hereinafter, referred to as an "auto mode").

On this shift map, an operating point of the transmission 4 is determined by the vehicle speed VSP and the primary rotation speed Npri. The inclination of a line connecting the operating point of the transmission 4 and a zero point at the lower left corner of the shift map indicates the speed ratio of the transmission 4 (overall speed ratio obtained by multiplying the speed ratio vRatio of the variator 20 by a speed ratio subRatio of the sub-transmission mechanism 30, hereinafter, referred to as a "through speed ratio Ratio"). In this shift map, a shift line is set for each accelerator pedal opening APO similar to a shift map of a conventional V-belt continuously variable transmission, and the transmission 4 is shifted in accordance with the shift line selected based on the accelerator position APO. For simplicity, only a full load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by maximizing the speed ratio vRatio of the variator 20 and a low-speed mode highest line obtained by minimizing the speed ratio vRatio of the variator 20. At this time, the operating point of the transmission 4 moves in areas A and B. On the other hand, when being in the high-speed mode, the transmission 4 can be shifted between a high-speed mode lowest line obtained by maximizing the speed ratio vRatio of the variator 20 and a high-speed mode highest line obtained by minimizing the speed ratio vRatio of the variator 20. At this time, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a low-speed mode ratio range which is a range of the through speed ratio Ratio of the transmission 4 that can be set in the low-speed mode and a high-speed mode ratio range which is a range of the through speed ratio Ratio of the transmission 4 that can be set in the high-speed mode partly overlap, and the transmission 4 can be selectively set in either one of the low-speed mode or the high-speed mode if the operating point of the transmission 4 is in the area B defined between the high-speed mode lowest line and the low-speed mode highest line.

The transmission controller 12 sets the through speed ratio Ratio corresponding to the vehicle speed VSP and the accelerator pedal opening APO (driving condition of the vehicle) as a final through speed ratio DRatio by referring to this shift map. This final through speed ratio DRatio is a target value which should be finally reached by the through speed ratio Ratio in this driving condition. Then, the transmission controller 12 sets a target through speed ratio tRatio which is a transient target value for causing the through speed ratio Ratio to follow the final through speed ratio DRatio with desired response characteristics, and controls the variator 20 and the sub-transmission mechanism 30 so that the through speed ratio Ratio coincides with the target through speed ratio tRatio.

On this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is equal to the low-speed mode highest speed ratio.

When the operating point of the transmission 4 crosses the mode switch shift line, i.e. the through speed ratio Ratio of the transmission 4 changes over the mode switch speed ratio mRatio, the transmission controller 12 executes a mode switch shift control. In this mode switch shift control, the transmission controller 12 shifts the sub-transmission mechanism 30 and performs a synchronization shift to change the speed ratio vRatio of the variator 20 in a direction opposite to a changing direction of the speed ratio subRatio of the sub-transmission mechanism 30.

In the synchronization shift, when the through speed ratio Ratio of the transmission 4 changes from a value larger than the mode switch speed ratio mRatio to a value smaller than that, the transmission controller 12 shifts up the gear position of the sub-transmission mechanism 30 from the first gear position to the second gear position (1-2 shift) and increases the speed ratio vRatio of the variator 20. Conversely, when the through speed ratio Ratio of the transmission 4 changes from a value smaller than the mode switch speed ratio mRatio to a value larger than that, the transmission controller 12 shifts down the gear position of the sub-transmission mechanism 30 from the second gear position to the first gear position (2-1 shift) and decreases the speed ratio vRatio of the variator 20.

The synchronization shift is performed at the time of a mode switch shift to suppress a sense of congruity given to a driver as the input rotation changes due to a difference in the through speed ratio Ratio of the transmission 4. The mode switch shift is performed when the speed ratio vRatio of the variator 20 is the highest speed ratio because a torque input to the sub-transmission mechanism 30 is the smallest in this state under a torque input to the variator 20 at that time and a shift shock of the sub-transmission mechanism 30 can be alleviated if the sub-transmission mechanism 30 is shifted in this state.

However, in a construction in which the mode switch shift is merely performed with the mode switch speed ratio mRatio set as a threshold value, the sub-transmission mechanism 30 is frequently shifted when the through speed ratio Ratio changes near the mode switch speed ratio mRatio and there is a possibility of reducing driving performance caused by recurring shift shocks and reducing the durability of the frictional engagement elements (low brake 32, high clutch 33) constituting the sub-transmission mechanism 30.

Accordingly, the transmission controller 12 allows a down shift of the sub-transmission mechanism 30 only in a condition where a large driving force, e.g. a driving force which cannot be attained with the sub-transmission mechanism 30 kept in the second gear position is required such as when the accelerator pedal is largely depressed, thereby lowering a shift frequency of the sub-transmission mechanism 30.

Figure 4:
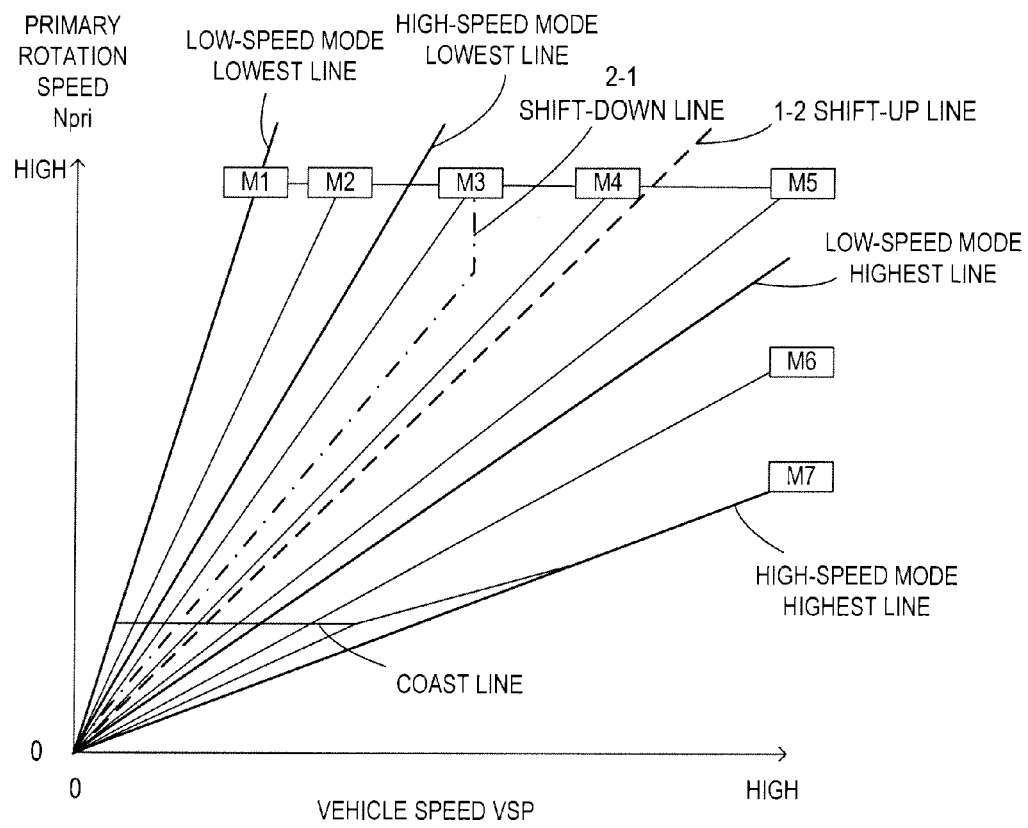
FIG. 4 is a graph showing an example of a shift map used in a manual mode.

On the contrary, in a mode in which the driver can select an arbitrary gear position by a selector operation or paddle operation and the transmission 4 is shifted, i.e. the variator 20 and the sub-transmission mechanism 30 are shifted to realize a speed ratio corresponding to the selected gear position (hereinafter, referred to as a "manual mode"), the shift map shown in FIG. 4 is used. In the following description, the gear positions of the transmission 4 in the manual mode are respectively called M1 gear position to M7 gear position to distinguish the gear positions of the transmission 4 and those of the sub-transmission mechanism 30 in the manual mode.

In this example, it is possible to select one out of the M1 gear position to the M7 gear position. A 1-2 shift-up line and a 2-1 shift-down line of the sub-transmission mechanism 30 are set at positions different from the mode switch shift line in the auto mode. The 1-2 shift-up line is set at a side lower than the low-speed mode highest line and between an M4 gear shift line and an M5 gear shift line, and the 2-1 shift-down line is set at a side higher than the high-speed mode lowest line and between an M3 gear shift line and the M4 gear shift line.

The gear position can be selected by operating the selector 45 (e.g. shifted up when the selector 45 is operated to a +gate and shifted down when it is operated to a −gate) and can also be selected by operating the paddle switch 48 provided on a steering wheel.

In the manual mode, the variator 20 and the sub-transmission mechanism 30 are controlled to realize the selected gear position and, depending on a combination of the present gear position and the selected gear position, the sub-transmission mechanism 30 is shifted. Specifically, the sub-transmission mechanism 30 is shifted in the case of crossing the 1-2 shift-up line or 2-1 shift-down line before and after a shift. Particularly, when the M1 gear position or M2 gear position is set after the shift, the speed ratios corresponding to these gear positions cannot be realized unless the sub-transmission mechanism 30 is in the first gear position. When the M6 gear position or M7 gear position is set after the shift, the speed ratios corresponding to these gear positions cannot be realized unless the sub-transmission mechanism 30 is in the second gear position. Thus, the sub-transmission mechanism 30 is invariably shifted unless the sub-transmission mechanism 30 is in the required gear position.

In the manual mode, in the case of a shift accompanied by a shift of the sub-transmission mechanism 30, only the variator 20 is first shifted to change the through speed ratio Ratio toward the one corresponding to the selected gear position upon the start of the shift and, thereafter, a synchronization shift of the variator 20 and the sub-transmission mechanism 30 is performed in order to improve shift responsiveness.

Specifically, if the through speed ratio corresponding to the selected gear position can be realized by shifting only the variator 20, only the variator 20 is shifted to realize the through speed ratio corresponding to the selected gear position and, thereafter, the synchronization shift is performed. If the through speed ratio corresponding to the selected gear position cannot be realized by shifting only the variator 20, the synchronization shift is performed after the variator 20 is shifted to attain the lowest speed ratio or highest speed ratio and, thereafter, the variator 20 is further shifted to realize the through speed ratio corresponding to the selected gear position.

In the case of shifting the sub-transmission mechanism 30, it is necessary to determine whether the input torque to the sub-transmission mechanism 30 is positive or negative (hereinafter, referred to as "power ON/OFF determination"). This is because shift phases occur in the order of a torque phase (phase in which a frictional engagement element responsible for torque transmission is switched) and an inertia phase (phase in which a speed ratio of the sub-transmission mechanism 30 actually changes) in up-shifting performed when the input torque is positive and in down-shifting performed when the input torque is negative, whereas the order of the shift phases is reversed and a required hydraulic control is different in up-shifting performed when the input torque is negative and in down-shifting performed when the input torque is positive.

Specifically, when the torque phase and the inertia phase occur in this order, the input rotation speed of the sub-transmission mechanism 30 in these phases is controlled by the torque capacity of an engage-side frictional engagement element which is to be engaged. On the other hand, when these phases occur in the reverse order, the input rotation speed of the sub-transmission mechanism 30 in the inertia phase is controlled by the torque capacity of a release-side frictional engagement element which is to be released and that in the torque phase is controlled by the torque capacity of an engage-side frictional engagement element which is to be engaged. Accordingly, if these controls are executed in a reverse order, the final through speed ratio cannot be attained or rotational stagnation is caused.

The power ON/OFF determination can be made, for example, based on an engine torque. However, if the sub-transmission mechanism 30 is shifted in a condition where the accelerator pedal opening is small and the engine torque is small in response to a selector operation or paddle operation by a driver in the manual mode, there is a possibility that the power ON/OFF determination is erroneously made in the case of judgment based on the engine torque. This is because, in such a condition, the input torque to the sub-transmission mechanism 30 becomes negative due to belt friction, an inertia change accompanying the shift of the variator 20 and the like even if the engine torque is positive.

Accordingly, in this embodiment, the transmission controller 12 makes the power ON/OFF determination based on the engine torque in the auto mode while making the power ON/OFF determination based on the input torque to the sub-transmission mechanism 30 in the manual mode.

Figure 5:
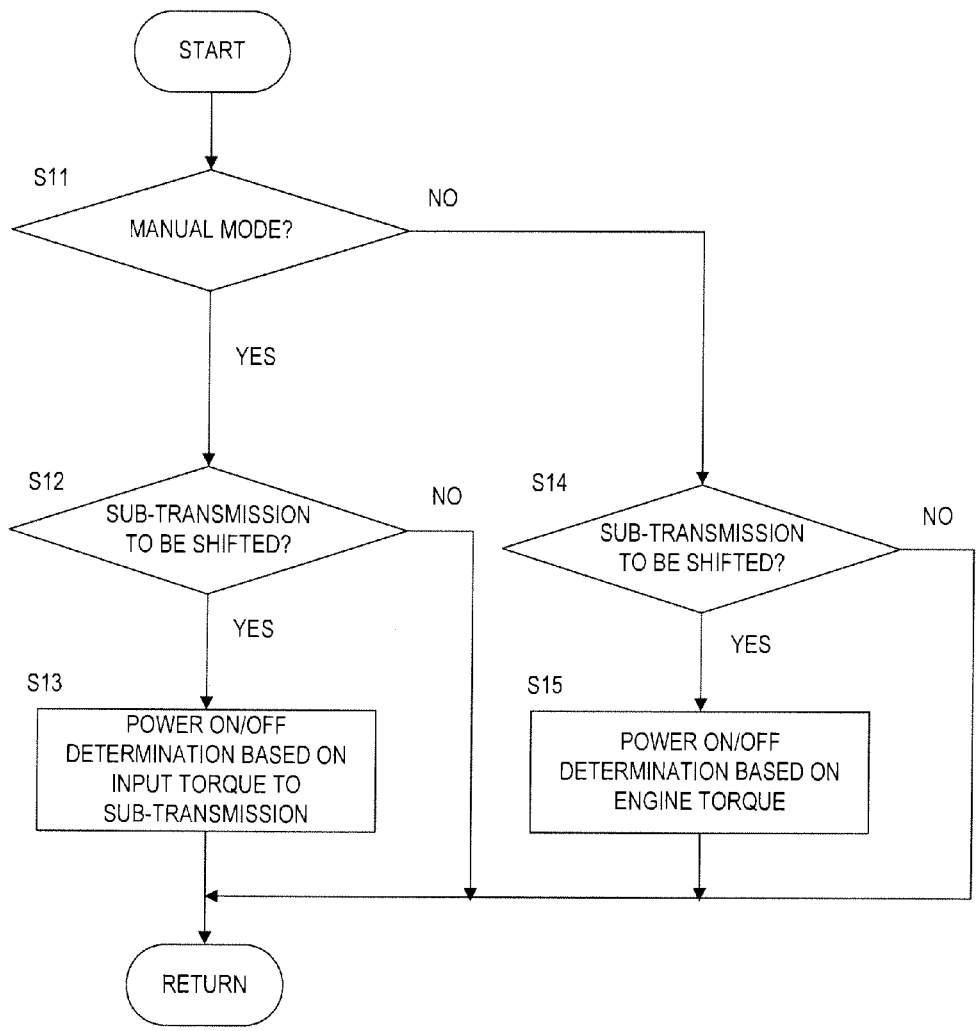
FIG. 5 is a flow chart showing a control content of a power ON/OFF determination.

FIG. 5 is a flow chart showing a control content of the power ON/OFF determination made by the transmission controller 12 and this flow chart is repeatedly performed at every interval of a specified time (e.g. every 10 msec.).

In S11, the transmission controller 12 judges whether or not the manual mode is set. The transmission controller 12 judges that the manual mode is set, for example, when the selector 45 is in an M-range or when the paddle switch 48 has been operated. The process proceeds to S12 when it is judged that the manual mode is set while proceeding to S14 when it is judged that the manual mode is not set, i.e. the auto mode is set.

In S12, the transmission controller 12 judges whether or not the sub-transmission mechanism 30 is to be shifted. The process proceeds to S13 when it is judged that the sub-transmission mechanism 30 is to be shifted while ending unless otherwise.

In S13, the transmission controller 12 makes the power ON/OFF determination based on the input torque to the sub-transmission mechanism 30.

The power ON/OFF determination based on the input torque to the sub-transmission mechanism 30 is composed of a determination based on an estimated torque when the shift of only the variator 20 performed earlier than the synchronization shift (shift of the sub-transmission mechanism 30) is finished, i.e. immediately before the sub-transmission mechanism 30 is shifted, and a determination based on a computed torque. The former determination is made while the accelerator pedal opening APO is not changed from the start of the shift, whereas the latter determination is made when the accelerator pedal opening APO changes from that at the start of the shift. It is determined that the accelerator pedal opening changes from that at the start of the shift when the variation amount of the accelerator pedal opening APO from the start of the shift exceeds a predetermined amount or when the accelerator pedal opening APO becomes zero.

First, the determination based on the estimated torque when the shift of only the variator 20 is finished is described. To estimate the input torque to the sub-transmission mechanism 30 when the shift of only the variator 20 is finished, the transmission controller 12 first computes a speed ratio vRatiom, which is the speed ratio of the variator 20 when the shift of only the variator 20 is finished. When the through speed ratio corresponding to the selected gear position can be realized by shifting only the variator 20, the speed ratio vRatiom is a value obtained by dividing the through speed ratio corresponding to the selected gear position by a speed ratio corresponding to the gear position of the sub-transmission mechanism 30 before the shift. When the through speed ratio corresponding to the selected gear position cannot be realized by shifting only the variator 20, the speed ratio vRatiom is the lowest or highest speed ratio of the variator 20.

Subsequently, the transmission controller 12 computes an engine torque when the shift of only the variator 20 is finished by referring to an unillustrated engine torque map based on the accelerator pedal opening APO and an engine rotation speed when the shift of only the variator 20 is finished. An estimated value of the input torque to the sub-transmission mechanism 30 when the shift of only the variator 20 is finished is obtained by subtracting an absolute value of a belt friction torque from a value obtained by multiplying the engine torque when the shift of only the variator 20 is finished by a gear ratio of the first gear train 3 and the speed ratio vRatiom.

When the shift is started, the transmission controller 12 first makes the power ON/OFF determination based on this estimated torque. The input torque to the sub-transmission mechanism 30 is determined to be positive (ON determination) if the estimated torque is larger than an ON/OFF determination threshold value while being determined to be negative (OFF determination) if the input torque is smaller than the ON/OFF determination threshold value.

The ON/OFF determination threshold value is set at a value larger than zero, e.g. 10 [N] in down-shifting while being set at 0 [N] in up-shifting. The ON/OFF determination threshold value is set at the value larger than zero in down-shifting so that the OFF determination is preferably made when the torque input to the sub-transmission mechanism 30 is near zero, thereby improving shift responsiveness at the time of down-shifting.

Although the engine torque when the shift of only the variator 20 is finished is used for estimation here, an engine torque at the start of the shift may be used.

Next, the determination based on the computed torque is described. To compute the input torque to the sub-transmission mechanism 30, the transmission controller 12 computes an engine torque based on an engine torque signal from the engine controller 13. Then, the transmission controller 12 computes the input torque to the sub-transmission mechanism 30 by subtracting the absolute value of the belt friction torque and an absolute value of an inertia torque accompanying the shift of the variator 20 from a value obtained by multiplying the engine torque by the speed ratio vRatio of the variator 20.

Then, the transmission controller 12 compares the computed input torque to the sub-transmission mechanism 30 with the ON determination threshold value and the OFF determination threshold value and determines the torque input to the sub-transmission mechanism 30 to be positive (ON determination) if the computed input torque to the sub-transmission mechanism 30 is larger than the ON determination threshold value while determining the torque input to the sub-transmission mechanism 30 to be negative (OFF determination) if it is smaller than the OFF determination threshold value.

The ON determination threshold value and the OFF determination threshold value are respectively set at values capable of determining that the input torque to the sub-transmission mechanism 30 is clearly positive and clearly negative. For example, the ON determination threshold value is set at 20 [N] and the OFF determination threshold value is set at −15 [N] in down-shifting, whereas the ON determination threshold value is set at 20 [N] and the OFF determination threshold value is set at −10 [N] in up-shifting.

Figure 6:
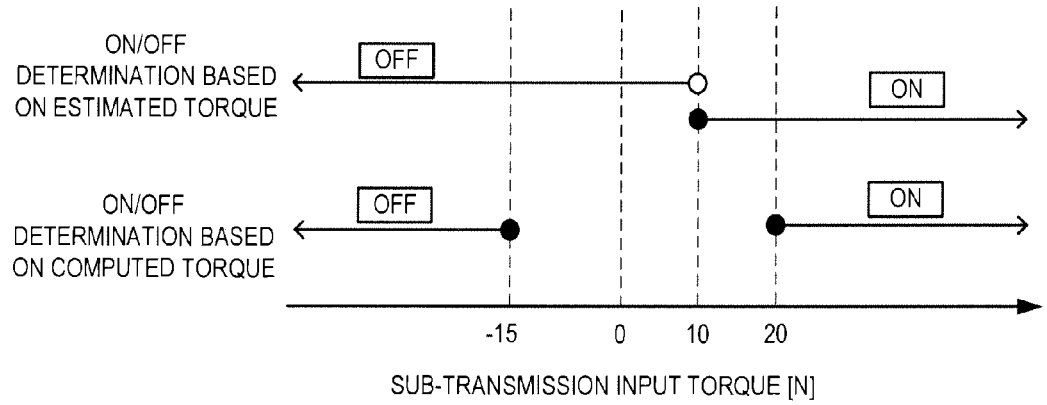
FIG. 6 is a chart showing threshold values used in the power ON/OFF determination in down-shifting.
Figure 7:
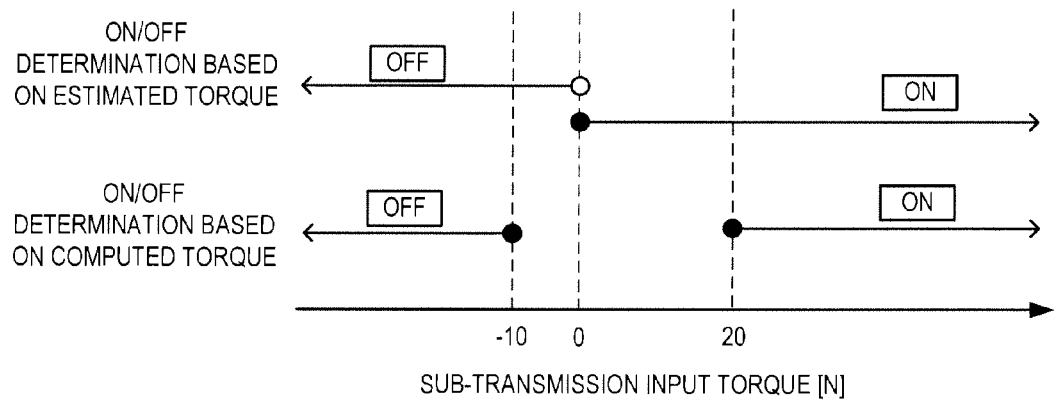
FIG. 7 is a chart showing threshold values used in the power ON/OFF determination in up-shifting.

Diagrammatic representation of the ON/OFF determination threshold values by the above two determination methods is as shown in FIG. 6 at the time of down-shifting and as shown in FIG. 7 at the time of up-shifting. By respectively setting absolute values of the ON and OFF determination threshold values at sufficiently large values in the determination based on the computed torque, an erroneous determination can be prevented even if the computed torque varies near zero due to a change in the inertia torque accompanying the shift of the variator 20.

Although the ON/OFF determination is switched from that based on the estimated torque to that based on the computed torque when an acceleration operation is performed in this embodiment, both determinations may be made in parallel, a determination result based on the estimated torque is used when the determination based on the computed torque is neither ON nor OFF and a determination result based on the computed torque may be used when the determination based on the computed torque is either ON or OFF.

In S14, the transmission controller 12 judges whether or not the sub-transmission mechanism 30 is to be shifted. The process proceeds to S15 when it is judged that the sub-transmission mechanism 30 is to be shifted while ending unless otherwise.

In S15, the transmission controller 12 makes the power ON/OFF determination based on the engine torque. Specifically, the transmission controller 12 computes an engine torque based on an engine torque signal from the engine controller 13, makes the power ON/OFF determination based on whether the computed engine torque is positive or negative, and determines that the torque input to the sub-transmission mechanism 30 is positive when the engine torque is positive and negative when the engine torque is negative.

The power ON/OFF determination is made by the above process and hydraulic pressures supplied to the engage-side frictional engagement element and the release-side frictional engagement elements of the sub-transmission mechanism 30 are controlled based on this determination result.

Next, advantages expected by making the above ON/OFF determination are described.

In the manual mode, there is a possibility that the sub-transmission mechanism 30 is shifted even in a condition where the accelerator pedal opening is small and the engine torque is small in response to a selector operation or paddle operation by a driver. In this case, the power ON/OFF determination may be possibly erroneously made in judgment based on the engine torque.

However, since the above power ON/OFF determination is made based on the input torque to the sub-transmission mechanism 30 in the manual mode, the power ON/OFF determination can be accurately made. An input torque immediately before the shift of the sub-transmission mechanism 30 is preferably used as the input torque to the sub-transmission mechanism 30 used for the determination. In the case of shifting the variator 20 before the sub-transmission mechanism 30 is shifted as in the above embodiment, the estimated torque when the shift of only the variator 20 is finished is used.

As a result, the order of occurrence of the torque phase and the inertia phase can be correctly judged and the hydraulic pressures supplied to the engage-side frictional engagement elements and the release-side frictional engagement elements of the sub-transmission mechanism 30 can be controlled in accordance with this order. This can avoid problems such as disruption of the synchronization shift caused by a rotation speed change in the torque phase or the occurrence of rotational stagnation caused by a slow change of the rotation speed despite the ongoing inertia phase.

According to the above ON/OFF determination, when an acceleration operation is performed during the shift in the manual mode, the input torque to the sub-transmission mechanism 30 is computed based on the engine torque, the speed ratio of the variator 20, the belt friction torque of the variator 20 and the inertia torque accompanying the shift of the variator 20, and the power ON/OFF determination is made based on this computed value. In this way, the power ON/OFF determination can be continuously made with high accuracy even if the acceleration operation is performed during the shift.

The embodiment of the present invention has been described above. The above embodiment is merely an illustration of one application example of the present invention and not of the nature to limit the technical scope of the present invention to the specific construction of the above embodiment.

For example, the v-belt continuously variable transmission mechanism is provided as the variator 20 in the above embodiment, but the variator 20 may be a continuously variable transmission mechanism in which a chain belt is mounted between the pulleys 21 and 22 instead of the V-belt 23.

Although the engine 1 is provided as the driving source, the driving source may be a combination of the engine 1 and a motor or may be a single motor.

This application claims priority based on Japanese Patent Application No. 2010-200831, filed with the Japan Patent Office on Sep. 8, 2010, the entire content of which is incorporated into this specification by reference.

What is claimed is:

1. A continuously variable transmission mounted in a vehicle to shift and transmit output rotation of a driving source, comprising:
   a variator which changes a speed ratio continuously;
   a stepped sub-transmission mechanism provided in series with the variator;
   a transmission control unit configured to select either one of an auto mode in which a final through speed ratio as a target value of an overall speed ratio of the variator and the sub-transmission mechanism is set based on a driving condition of the vehicle and the variator and the sub-transmission mechanism are controlled to realize the final through speed ratio, or a manual mode in which a gear position of the continuously variable transmission is selected based on an input operation from a driver, the final through speed ratio is set based on the selected gear position and the variator and the sub-transmission mechanism are controlled to realize the final through speed ratio; and
   a power ON/OFF determination unit configured to determine whether an input torque to the sub-transmission mechanism is positive or negative based on the input torque to the sub-transmission mechanism when the manual mode is selected.

2. The continuously variable transmission according to claim 1, wherein:
   the transmission control unit is configured to shift the variator earlier than the sub-transmission mechanism in the manual mode; and
   the power ON/OFF determination unit is configured to estimate a value of a torque when a shift of only the variator is finished as the input torque to the sub-transmission mechanism, and
   determine whether the input torque to the sub-transmission mechanism is positive or negative based on the estimated value when the manual mode is selected.

3. The continuously variable transmission according to claim 1, wherein:
   the transmission control unit is configured to shift the variator earlier than the sub-transmission mechanism in the manual mode; and
   the power ON/OFF determination unit is configured to compute the input torque to the sub-transmission mechanism based on a torque of the driving source, the speed ratio of the variator, a belt friction torque of the variator and an inertia torque accompanying a shift of the variator, and
   determine whether the input torque to the sub-transmission mechanism is positive or negative based on a computed value when the manual mode is selected and an acceleration operation is performed on the driving source during the shift.

4. A power ON/OFF determination method for determining whether an input torque to a stepped sub-transmission mechanism is positive or negative in a continuously variable transmission including a variator which changes a speed ratio continuously, the sub-transmission mechanism being provided in series with the variator and mounted in a vehicle to shift and transmit output rotation of a driving source, and a controller which controls the variator and the sub-transmission mechanism, the method comprising:
   selecting, by the controller, either one of an auto mode in which a final through speed ratio as a target value of an overall speed ratio of the variator and the sub-transmission mechanism is set based on a driving condition of the vehicle and the variator and the sub-transmission mechanism are controlled to realize the final through speed ratio, or a manual mode in which a gear position of the continuously variable transmission is selected based on an input operation from a driver, the final through speed ratio is set based on the selected gear position and the variator and the sub-transmission mechanism are controlled to realize the final through speed ratio; and
   determining, by the controller, whether the input torque to the sub-transmission mechanism is positive or negative based on the input torque to the sub-transmission mechanism when the manual mode is selected.

5. The power ON/OFF determination method according to claim 4, wherein:

the variator is shifted by the controller earlier than the sub-transmission mechanism in the manual mode;

a value of a torque when the shift of only the variator is finished is estimated by the controller as the input torque to the sub-transmission mechanism; and whether the input torque to the sub-transmission mechanism is positive or negative is determined by the controller based on the estimated value when the manual mode is selected.

6. The power ON/OFF determination method according to claim 4, wherein:

the variator is shifted by the controller earlier than the sub-transmission mechanism in the manual mode;

the input torque to the sub-transmission mechanism is computed by the controller based on a torque of the driving source, the speed ratio of the variator, a belt friction torque of the variator and an inertia torque accompanying the shift of the variator; and whether the input torque to the sub-transmission mechanism is positive or negative is determined by the controller based on a computed value when the manual mode is selected and an acceleration operation is performed on the driving source during the shift.

7. A continuously variable transmission mounted in a vehicle to shift and transmit output rotation of a driving source, comprising:

a variator which changes a speed ratio continuously;

a stepped sub-transmission mechanism provided in series with the variator;

means for selecting either one of an auto mode in which a final through speed ratio as a target value of an overall speed ratio of the variator and the sub-transmission mechanism is set based on a driving condition of the vehicle and the variator and the sub-transmission mechanism are controlled to realize the final through speed ratio, or a manual mode in which a gear position of the continuously variable transmission is selected based on an input operation from a driver, the final through speed ratio is set based on the selected gear position and the variator and the sub-transmission mechanism are controlled to realize the final through speed ratio; and determination means for determining whether an input torque to the sub-transmission mechanism is positive or negative based on the input torque to the sub-transmission mechanism when the manual mode is selected.

8. The continuously variable transmission according to claim wherein:

the variator is shifted earlier than the sub-transmission mechanism in the manual mode; and the means for determining an estimated value of a torque when the shift of only the variator is finished as the input torque to the sub-transmission mechanism and determines whether the input torque to the sub-transmission mechanism is positive or negative based on the estimated value when the manual mode is selected.

9. The continuously variable transmission according to claim 7, wherein:

the variator is shifted earlier than the sub-transmission mechanism in the manual mode; and the means for determining computes the input torque to the sub-transmission mechanism based on a torque of the driving source, a speed ratio of the variator, a belt friction torque of the variator and an inertia torque accompanying the shift of the variator, and determines whether the input torque to the sub-transmission mechanism is positive or negative based on a computed value when the manual mode is selected and an acceleration operation is performed on the driving source during the shift.

* * * * *